(No Model.)
J. P. GRUBER.
STORE SERVICE MEASURING APPARATUS FOR OILS AND SIMILAR FLUIDS.
No. 348,669. Patented Sept. 7, 1886.
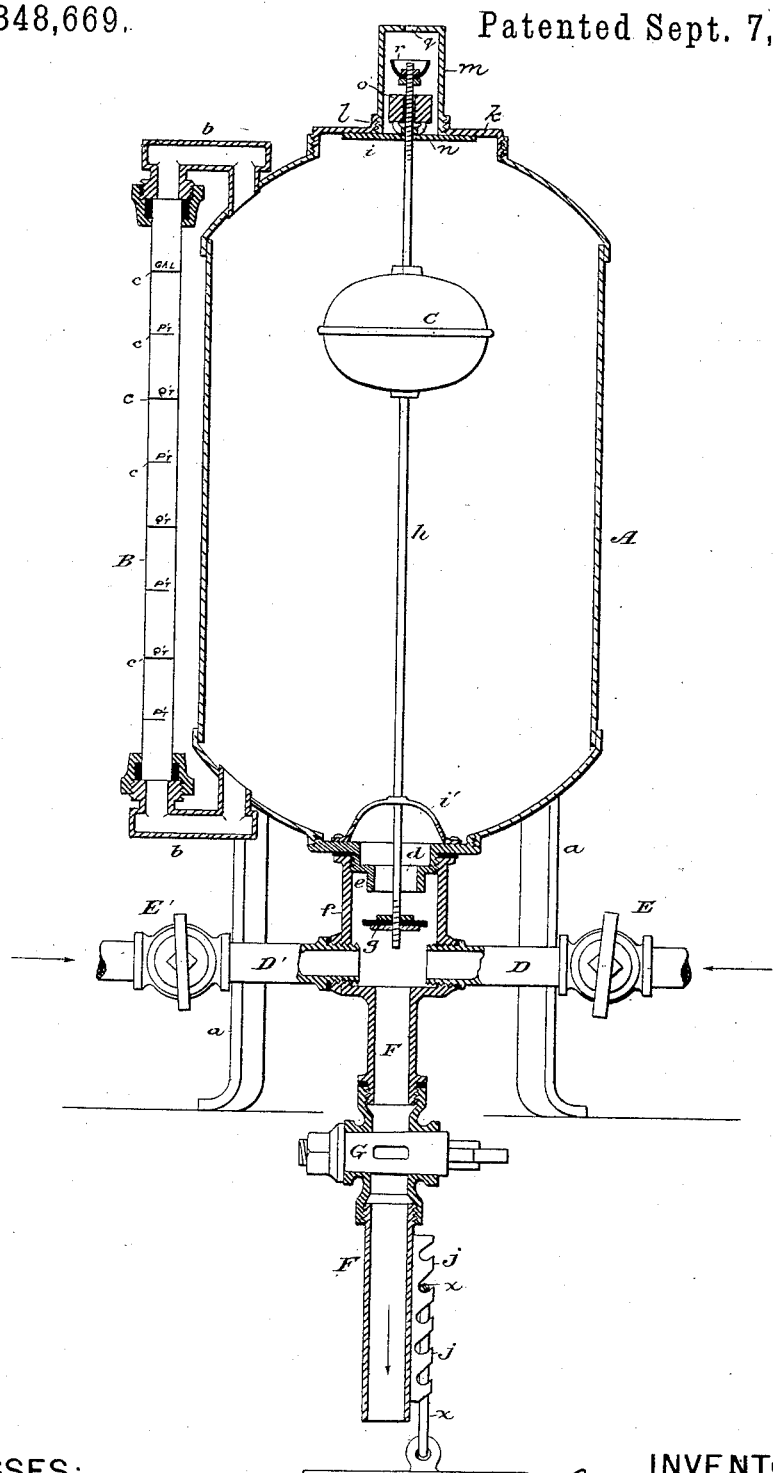
WITNESSES:
E. B. Bolton
Geo. Bainton
INVENTOR:
John P. Gruber
By his Attorneys,
Burke, Fraser & Connell

UNITED STATES PATENT OFFICE.

JOHN P. GRUBER, OF JERSEY CITY, NEW JERSEY.

STORE-SERVICE MEASURING APPARATUS FOR OILS AND SIMILAR FLUIDS.

SPECIFICATION forming part of Letters Patent No. 348,669, dated September 7, 1886.

Application filed March 16, 1886. Serial No. 195,422. (No model.)

*To all whom it may concern:*

Be it known that I, JOHN P. GRUBER, a citizen of the United States, and a resident of Jersey City, in the county of Hudson and State of New Jersey, have invented certain new and useful Improvements in Store-Service Measuring Apparatus for Oils and similar Liquids, of which the following is a specification.

My invention relates to that class of service apparatus which is designed for use in the retailing of liquids which, for various reasons, it is not desirable to keep in the salesroom of a store—as, for example, kerosene-oils, turpentine, alcohol, &c.

The object of my invention is to provide a means for measuring the liquid in a close receiver having a self-closing valve, to prevent any of the liquid above a certain predetermined quantity from entering the receiver; to arrange the automatic cut-off valve at a point where it will always be submerged in the liquid, whereby the latter is prevented from collecting and drying thereon by alternate exposure to the air and to the liquid, and to provide a convenient means for attaching to the apparatus a vessel to receive the measured liquid. This apparatus is kept in the salesroom conveniently at hand, and is connected with the cask or reservoir containing the liquid by means of a pipe. This cask may be kept on one side of the upper floors or anywhere, so that it is a little above the level of the apparatus; or, it may be kept in the cellar and the liquid be forced up to the level of the apparatus by compressed air, any of the well-known air-compressing machines being employed for the purpose. I may say that some of these last-named machines utilize the pressure of water in the street-mains as a source of power, and such may be conveniently employed in cities having water-service.

My invention will be hereinafter more particularly described, and its novel features carefully defined in the claims.

In the drawing which serves to illustrate my invention, the apparatus is represented in sectional elevation, the plane of the section being axial.

A represents a receiver, which in the present instance is shown as having a capacity of one gallon, though the capacity is not material. This receiver may be of any suitable form and be constructed of any suitable material. I have shown it as of cylindrical form with convex heads and made of sheet metal. I usually construct it to stand up endwise, and provide it with legs *a a*. This receiver I provide with a transparent gage, B, which shows the level of the liquid at all times, and also the quantity contained in the receiver and the amount (by subtraction) that may be drawn off at any time. I prefer to construct this gage of a glass tube connected at top and bottom with the top and bottom of the receiver through the medium of tubular connections *b b*, and to graduate the tube by marking on it, at the proper points, conspicuous lines *c c*, and letters, as "Gal.," "Qt.," and "Pt.," to indicate the amount of liquid standing in the vessel at any time. I prefer a tube-gage of this character as the level of the liquid is best seen in this tube by reason of the transmitted light; but a transparent plate may be set in the side of the receiver itself, such as is sometimes employed in liquid-measures; or, if the receiver were made of glass, as it might be, the graduation might be placed on its sides. The receiver A receives and discharges through the same aperture, *d*, in its bottom, and this aperture is provided with a valve-seat, *e*.

In a valve-chamber, *f*, which houses the valve-seat, is arranged a valve, *g*, which must rise to press upon the valve-seat and close the aperture *d*, and must fall to open a passage for the ingress and egress of the liquid. The valve *g* is attached to a long stem, *h*, which extends up through the axis of the receiver, and has guide-bearings in bridge-pieces *i i'*, one at the top and one at the bottom of the receiver. On the stem *h*, at the proper point, is fixed a float, C, which, when the liquid rises in the receiver to the level of the mark *c*, indicating one gallon, rises and lifts the valve *g*, through the medium of its stem, up to its seat, and thus cuts off the ingress of any more of the liquid.

D is an induction or supply pipe, which leads the liquid from the cask to the valve-chamber *f*, and E is a cock which controls this pipe.

F is the eduction or delivery tube, which delivers the liquid from the receiver to any suitable vessel, as X. This delivery or service tube I usually connect to the bottom of the valve-chamber, and I provide it with a controlling-cock, G. On the lower end of tube F are one or more hooks, j j, usually formed integrally with the tube. These serve to support the vessel X, the bail x of which catches over one or the other of said hooks. I usually employ a number of such hooks j, arranged one above the other, as shown, in order to better accommodate vessels of different sizes or kinds.

The operation is as follows: The cock G being closed, as shown, the cock E is opened, and the liquid flows through valve-chamber f and aperture d into the receiver A. When it has reached the level indicated by the "gallon-mark" on the gage B, the float C will have been lifted high enough to seat the valve g and prevent the influx of any more liquid. Now, if it be desired to draw off into a vessel, as X, any quantity—say one quart—the attendant hangs the vessel on a hook j, closes cock E, and opens cock G. The liquid now flows through aperture d and service-tube F into vessel X. The attendant, with his hand on cock G, observes the gage B and notes when the level has fallen to the second mark c, below the gallon-mark, when he instantly closes cock G. Cock E may now again be opened, when the receiver will fill again, as before.

D' is an inlet-pipe, and E' is a cock controlling the same. This inlet-pipe comes from another liquid reservoir or receptacle, and is capable of supplying a liquid to the receiver A, the same as inlet-pipe D. Thus liquids of two kinds, or two grades of the same kind, may be measured by the same apparatus. Two or more inlets, similar to D and D', may be employed; but I do not limit myself to the use of more than one.

For convenience in assembling the parts of my apparatus I solder or otherwise secure the float C to the valve-stem, then make an aperture in the top of the receiver large enough to pass the float through. This aperture is closed by a plate, k, which carries the bridge i, and which has on it also a screw-threaded socket, l, in which is screwed a cap, m, provided with an aperture or apertures, q, to allow the air to escape when the receiver is being filled. The upper end of the valve-stem h, which projects up into this cap m, is screw-threaded, and on it is screwed a thumb-nut, n, which serves to limit the downward movement of the valve-stem and valve.

On the upwardly-projecting end of the valve-stem h, inside of cap m, may be placed one or more weights, each with a central hole or socket, to serve as regulators and adjusters of the measure. In the drawings, o represents such a weight. For example, if the float should be found to rise too quickly and close the valve before the liquid reaches the level of the gallon mark, by placing a weight, o, of the proper size on the upper end of the stem this defect will be corrected. The weight, its proper capacity once ascertained, might be fixed to the stem h; but for convenience of taking the apparatus apart for cleansing I usually make the weight readily removable.

In order to prevent the vaporization of the liquid in the receiver through the air aperture or apertures q in cap m, I prefer to mount on the upper end of valve-stem h a thin soft valve, r, which, when the valve-stem rises and brings valve g up to its seat, is carried up and caused to close the aperture q. The cup form of valve r and the flexibility of its margin enable it to close the aperture q without interfering with the seating of valve g. Where volatile liquids are dealt with, this valve is very useful.

To get at the valve g, the valve-chamber is made to screw onto a nipple on the receiver, and the valve itself, which I usually make of a disk of leather clamped between two metal disks, may be readily removed from the stem, as said clamping-disks are screwed thereon in the manner of nuts.

It will be seen that, normally, the valve will be submerged in whatever liquid is passed through the apparatus, and therefore cannot be rendered inoperative by the drying or partial drying of the liquid thereon. For use with thick liquids, like varnishes, it would be better to employ a very large gage-tube, or to mark the graduations on the body of the receiver itself, which in that case would be made wholly or partially of glass. Such liquids flow sluggishly, and where the gage-tube is small the level in it and the receiver will not be uniform during the rapid outflow of the liquid.

In the case of volatile liquids having disagreeable odors it is very desirable that they be kept out of the salesroom where they are sold, and it is one of the advantages of my apparatus that it enables this to be done, and yet allows of the liquid being drawn in the salesroom.

The hooks j on the delivery-pipe are not essential to my apparatus, but I consider them a convenience.

I do not limit myself to the precise form and arrangement of the parts as herein shown. For example, the valve r need not necessarily be of cup form, nor need the cap m be screwed onto the socket l.

Having thus described my invention, I claim—

1. The combination, with the receiver provided with a graduated gage to show the level of the liquid therein and a cock-controlled aperture for the ingress of the liquid at its bottom, of the valve for closing said aperture, its stem and float, and a cock-controlled outlet-tube for the liquid, substantially as set forth.

2. The combination, with the receiver provided with a graduated gage, to show the level of the liquid therein, and an aperture, d, and valve-seat e at its bottom, of the valve-chamber f, secured to the receiver, the inlet-pipe D and its cock, the outlet-tube F and its cock, arranged substantially as shown, the valve g, arranged in the chamber f, its stem h, mounted to play in guides in the receiver, and the float C, attached to the valve-stem, substantially as and for the purposes set forth.

3. The outlet or service tube F, provided with a series of hooks, *j j*, substantially as and for the purposes set forth.

4. The receiver A, provided with a single aperture in its bottom for the ingress and egress of the fluid, in combination with a valve-chamber, *f*, mounted on the receiver and inclosing said inlet, and connected with the receiving and delivery pipes, and the float-controlled valve arranged in said valve-chamber and operating as shown, whereby the said valve is normally submerged in the liquid, as set forth.

5. The combination, with the receiver A, provided at its bottom with a single aperture, *d*, for both the ingress and egress of the liquid, and with a valve-chamber, *f*, housing this aperture, of the two independent cock-controlled inlet-pipes D and D', entering said valve-chamber, the single cock-controlled outlet-pipe F from said valve-chamber, and the means, substantially as described, for closing the aperture *d* automatically, whereby two different kinds or grades of liquids may be measured by the same apparatus, substantially as set forth.

6. The combination, with the receiver provided with an aperture, *d*, for the ingress of the liquids at its bottom, and with an aperture, *q*, for the escape of the air at its upper part, of the valve-stem *h*, carrying the valves *g* and *r*, for closing, respectively, the apertures *d* and *q*, and the float C, for operating said valves, substantially as set forth.

In witness whereof I have hereunto signed my name in the presence of two subscribing witnesses.

JOHN P. GRUBER.

Witnesses:
HENRY CONNETT,
ARTHUR C. FRASER.